W. ADAMSON & C. F. A. SIMONIN.
Process of Extracting Oils by Filtration and Trickling.
No. 203,981. Patented May 21, 1878.
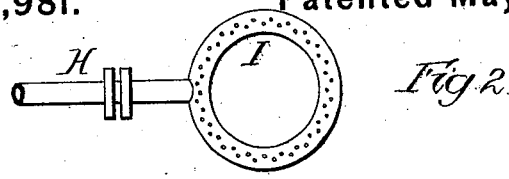
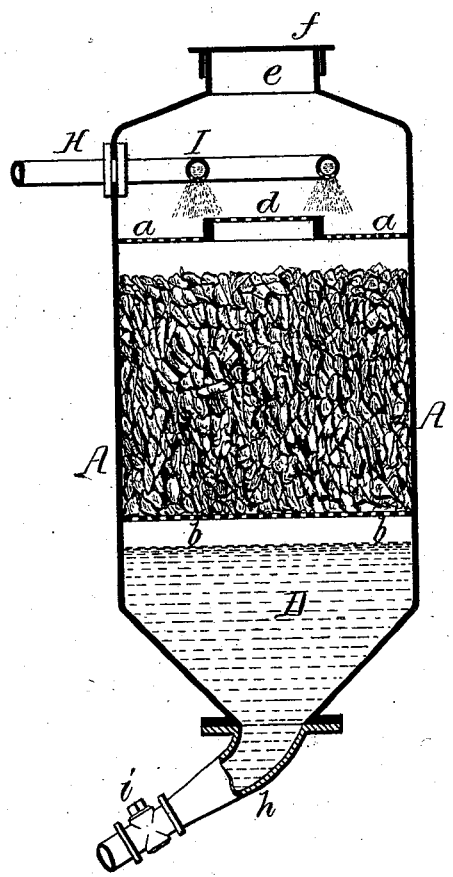

UNITED STATES PATENT OFFICE.

WILLIAM ADAMSON AND CHARLES F. A. SIMONIN, OF PHILADELPHIA, PENNSYLVANIA, ASSIGNORS TO SAID ADAMSON.

IMPROVEMENT IN PROCESSES FOR EXTRACTING OILS BY FILTRATION AND TRICKLING.

Specification forming part of Letters Patent No. 203,981, dated May 21, 1878; application filed March 28, 1878.

*To all whom it may concern:*

Be it known that we, WILLIAM ADAMSON and CHARLES F. A. SIMONIN, both of Philadelphia, Pennsylvania, have invented a new and useful Improvement in Treating Animal and Vegetable Substances with Hydrocarbons, of which the following is a specification:

Our invention relates to the treatment of vegetable and animal substances with hydrocarbons, for the purpose of extracting therefrom oily, fatty, and resinous matter; and the object of our invention is to cause hydrocarbon to trickle through such substances instead of flooding the same, so that it will take up the oily, fatty, and resinous matter without any of the albuminous or gelatinous ingredients.

In the accompanying drawing, Figure 1 is a vertical section of apparatus wherewith our invention may be carried into effect; Fig. 2, an inverted plan view of part of Fig. 1.

A is a vessel, preferably of cylindrical form, and containing an upper perforated diaphragm, $a$, and lower perforated diaphragm, $b$, the former having a central opening, through which the material to be treated may be introduced between the two diaphragms, and this opening having a detachable perforated cover, $d$.

On the top of the vessel there is an opening, $e$, furnished with a detachable cover, $f$; and at the bottom of the vessel there is an outlet-pipe, $h$, furnished with a suitable cock or valve, $i$.

Liquid hydrocarbon, preferably such as is of a volatile character—benzine, benzole, or gasoline, for instance—is introduced into the vessel above the diaphragm $a$ through a pipe, H, and perforated ring I, or otherwise, the hydrocarbon passing through the diaphragm and falling in a shower onto the substance contained in the vessel.

The hydrocarbon will trickle through the mass, taking up whatever oily, resinous, or fatty matter it comes in contact with until it falls through the lower diaphragm into the space D, whence it may be drawn off from time to time through the outlet-pipe $h$.

In extracting oily, fatty, or resinous matter from vegetable or animal substances by hydrocarbons, it has been the practice either to subject them to hydrocarbon vapors, as described in the Letters Patent No. 118,668, granted to Wm. Adamson, September 6, 1871, or to immerse or steep the substances in hydrocarbon until the latter takes up the oily, fatty, or resinous matter.

We prefer the vapor plan in treating wet animal substances, such as offal; but for dry vegetable or animal matter—seeds, for instance, or the residuum resulting from the rendering of tallow—we prefer the plan before described.

The flooding or steeping of animal or vegetable matter in liquid hydrocarbon results in a mixture or emulsion of gelatinous, albuminous, and fatty or oily matter, combined with animal or vegetable tissues, the whole forming an amalgamated mass; hence whatever fatty or oily matter is extracted is accompanied with more or less of the suspended gelatine or albumen, which are difficult to remove from the oil or fat, and have a tendency to discolor the same.

We have found that this difficulty can be obviated by preventing the hydrocarbon from remaining in a quiescent state in contact with the material; in other words, by causing it to trickle through the mass, which, by this plan, retains its granular condition and gives out its oil or fat to the hydrocarbon without the albuminous or gelatinous matter.

In the apparatus before described, for instance, the extract in the lower portion of the vessel A is never permitted to reach the lower diaphragm $b$; otherwise the objectionable flooding of the material, tending to bring about the results before described, would occur, the extract being drawn off from time to time, so that there may be no impediment to the free discharge of the hydrocarbon with such oily and resinous matter as it has taken up, through the lower diaphragm, and so that there may be a continuous dripping of hydrocarbon through the mass.

The extract obtained by the above-described trickling or filtering processes is much more concentrated than that obtained by the steeping or flooding process.

Without restricting ourselves to the apparatus herein described,

We claim as our invention—

The mode herein described of extracting oily, fatty, and resinous matter from vegetable and animal substances—that is to say, by causing liquid hydrocarbon to trickle through a mass of such substances in a closed vessel, and preventing it from being subjected to steeping or flooding, as specified.

In testimony whereof we have signed our names to this specification in the presence of two subscribing witnesses.

WILLIAM ADAMSON.
CHS. F. A. SIMONIN.

Witnesses:
HARRY A. CRAWFORD,
HARRY SMITH.